US008810187B2

(12) United States Patent
Vu

(10) Patent No.: US 8,810,187 B2
(45) Date of Patent: Aug. 19, 2014

(54) METHOD AND APPARATUS FOR MISSTEP DETECTION AND RECOVERY IN A STEPPER MOTOR

(75) Inventor: Hung D. Vu, Pembroke, MA (US)

(73) Assignee: Oriental Motor Boston Technology Group Incorporated, Braintree, MA (US)

( * ) Notice: Subject to any disclaimer, the term of this patent is extended or adjusted under 35 U.S.C. 154(b) by 197 days.

(21) Appl. No.: 13/507,965

(22) Filed: Aug. 9, 2012

(65) Prior Publication Data

US 2013/0043822 A1    Feb. 21, 2013

Related U.S. Application Data

(60) Provisional application No. 61/575,362, filed on Aug. 19, 2011.

(51) Int. Cl.
| | |
|---|---|
| H02P 8/00 | (2006.01) |
| H02P 1/04 | (2006.01) |
| H02P 6/16 | (2006.01) |
| G05B 19/40 | (2006.01) |
| G05B 11/00 | (2006.01) |
| H02P 6/00 | (2006.01) |

(52) U.S. Cl.
USPC ............... 318/696; 318/400.09; 318/400.12; 318/685; 318/686; 318/701

(58) Field of Classification Search
USPC ........ 318/400.09, 400.12, 685, 686, 696, 701
See application file for complete search history.

(56) References Cited

U.S. PATENT DOCUMENTS

| | | | |
|---|---|---|---|
| 5,663,624 A | 9/1997 | Callaway | |
| 5,880,541 A * | 3/1999 | Hinds et al. | 310/12.19 |
| 6,873,129 B1 * | 3/2005 | Leverett et al. | 318/605 |
| 7,205,738 B2 * | 4/2007 | Chapman et al. | 318/400.12 |
| 7,495,409 B2 * | 2/2009 | Coutu | 318/685 |
| 7,604,422 B2 * | 10/2009 | Julian et al. | 396/484 |
| 7,808,200 B2 * | 10/2010 | Liu et al. | 318/700 |
| 7,863,851 B2 * | 1/2011 | Chandhoke | 318/696 |
| 2001/0050699 A1 * | 12/2001 | Hickman | 347/37 |
| 2003/0137273 A1 * | 7/2003 | Davidov | 318/685 |

\* cited by examiner

*Primary Examiner* — Bentsu Ro
*Assistant Examiner* — Gabriel Agared
(74) *Attorney, Agent, or Firm* — Ira S. Dorman

(57) ABSTRACT

A stepper motor system and apparatus use a position-feedback device, which may have a resolution capability as low as 200 counts per motor shaft revolution, for misstep detection and motor step recovery. In use of the system, position deviation is computed periodically and cyclically, by subtracting the feedback position from the corresponding commanded position, to determine the load angle, implicitly, and the operating status of the motor. If the load angle is within an established allowable range of values, normal stepper operation along the programmed trajectory is maintained, without adjustment. A load angle that exceeds the limits of that range however indicates that a misstep has occurred, and the system controller initiates immediate action to recover lost motor steps, to reestablish synchronism, and to then continue toward the final target position, with minimal loss of time.

10 Claims, 3 Drawing Sheets

METHOD AND APPARATUS FOR MISSTEP DETECTION AND RECOVERY IN A STEPPER MOTOR

CROSS-REFERENCE TO RELATED APPLICATION

This application claims the benefit of U.S. Provisional Patent Application No. 61/575,362, entitled "Method and Apparatus for Misstep Recovery In Stepper Motor That Require Very Low Resolution Position Feedback," filed Aug. 19, 2011, the entire specification of which is incorporated hereinto by reference.

BACKGROUND OF THE INVENTION

Stepper motors and servo motors are typical of devices that are used where precise position capability is required in mechanical positioning systems. Such motors are employed widely in numerous applications, including for example factory and office automations, food processing installations, packaging applications, inspection machines, medical devices and apparatus, etc.

Unlike servo motors, which inherently require the incorporation of feedback devices (such as encoders and resolvers) having at least fairly high resolution capability, and closed-loop control (e.g., a PID), to afford constant detection and to enable correction of position and velocity errors, stepper motors typically operate in a synchronous, open-loop mode and do not therefore require any position-feedback device or control loop. Moreover, stepper motors are much easier to use and are more cost effective than servo motors.

Operating a stepper motor in a simple, open-loop mode entails a significant drawback, however, with regard to actual positioning capability. Because position-feedback information is not available, control is based upon the assumption that the motor shaft (i.e., the rotor) will always follow the commanded position trajectory. Because that assumption is known to be generally incorrect, in order to accommodate it the motor torque utilization by the load is normally kept below 50% of theoretical or design capacity; since the greater the torque margin available, the lower will be the likelihood that missteps (i.e., slipped or lost poles, or electrical cycles) will occur during operation. If, on the contrary, the external load applied were to exceed the maximum torque capability of the motor for any reason (such as, for example, due to momentary mechanical binding), one or more missteps may occur, and the motor may stall completely throughout the remainder of the commanded trajectory, resulting in a failure to reach the target position.

In an effort to avoid the positioning problems that are associated with open-loop operation, some manufacturers have installed encoders (or like devices) into stepper motors to enable tracking of the motor shaft position and to provide feedback signals to the controller for position verification. In one such modified form the motor operates an open-loop fashion, with actual position being verified by comparing a feedback position to the commanded position after motion has been completed; a correction move is then the generated to recover any steps that may have been lost during operation, ultimately to attain the target position. A major drawback of such systems resides in the fact that, depending upon the position at which the motor stalled during profiling, the subsequently applied correction move can take an inordinate amount of time (e.g., as long as it would have taken to complete the previous, intended motion).

Closed-loop control may also be applied to an encoder-augmented stepper motor in a system that includes a more sophisticated (typically PID+) control algorithm. While missteps can thereby be avoided, other difficulties are often associated with such methods. Firstly, the position-feedback device must have a relatively high-resolution capability in order to accommodate a high pole count; that significantly increases the cost of the system, and high-resolution devices are, of necessity, usually larger and more difficult to manufacture than are otherwise comparable low-resolution devices. And moreover, PID controller gains must be tuned properly to the load condition, and start-up positions can be inaccurate due to encoder absolute error or external loads that produce a bias between the stator command position and the rotor with encoder position, thereby compromising peak torque and control stability.

Representative of the pertinent patent art in the technical field to which the present invention is directed are the following United States patents:

Callaway U.S. Pat. No. 5,663,624 provides a closed-loop method and apparatus for controlling acceleration and velocity of a stepper motor. A position error signal is generated and compared to a reference value, which value is decreased if the motor velocity is too high or increased if the motor velocity is too low. Specifically, the switching angle is adjusted to drive the rotor in accordance with preselected acceleration profiles.

Coutu U.S. Pat. No. 7,495,409 discloses a method and apparatus for eliminating stall and cogging in multi-phase stepper motors, whereby and wherein the lead or lag relationship between the stator and rotor is monitored continuously by an encoder (particularly, an incremental encoder) operating in a feedback relationship. The circuit provided adjusts the lead or lag within a range of optimal values to prevent motor stalls and motor cogging; i.e., the rotor is kept in a stable region in which it leads or lags the stator by an amount that is near one full step.

Chandhoke U.S. Pat. No. 7,863,851 discloses a stepper motor control system and method, comprised of a primary or actual axis (primary controller), providing open-loop control of the motor, and a second monitoring axis (secondary controller) for monitoring error using an encoder, or other component included in the motor, for detecting current positions and generating correction positions, in a periodic or cyclical fashion continuously during motor operation. The correction positions may be incorporated with the next position change from the primary axis to allow closed-loop control of the motor (e.g., to correct for stalls or lost motor steps).

BRIEF SUMMARY OF THE INVENTION

It is the broad object of the present invention to provide a novel stepper motor apparatus and system, and a novel method utilizing the same, wherein and whereby missteps, are readily detected using periodic position feedback data, to thereby enable immediate recovery of lost motor steps.

A more specific object of the invention is to provide such an apparatus, system, and method wherein and whereby load angle values, based upon position error determinations, are utilized to indicate the occurrence of missteps.

A further specific object of the invention is to provide an apparatus, system, and method having the foregoing features and advantages, wherein a position error feedback signal is also utilized to determine the number of motor steps that are lost during any sampled (or "instant") period, or during any prior period if they were not previously detected.

An additional object of the invention is to provide an apparatus, system, and method having the foregoing features and advantages wherein and whereby cost and operating benefits may be afforded, as compared to comparable, currently known apparatus, systems, and methods.

It has now been found that certain of the foregoing and related objects are attained by the provision of a method for misstep detection and motor step recovery in a stepper motor operating in synchronous, open-loop mode, comprising the steps:

operating a stepper motor in synchronous, open-loop mode to produce movement along a trajectory comprised of commanded positions;

establishing a range of load angle values that are representative of normal motor operation, with load angle values outside of that range being indicative of the occurrence of at least one misstep;

periodically, in the course of movement of the stepper motor along the trajectory, accessing feedback signals generated by a position-feedback device to determine the actual position of the motor shaft;

periodically, in the course of movement of the stepper motor along the trajectory, computing deviations from commanded positions by subtracting actual shaft positions, indicated by the accessed feedback signals generated by the position-feedback device, from the corresponding commanded positions;

utilizing each computed position deviation solely to determine if it corresponds to a load angle value that lies either within or beyond the range of load angle values established;

if, throughout each period of position-indicating feedback signal access, the corresponding load angle value is determined to lie within the established range, maintaining normal stepper operation of the motor along the programmed trajectory, without adjustment; and if, during any period of position-indicating feedback signal access, the corresponding load angle value is determined to lie beyond the established range, immediately taking action for recovery of lost motor steps.

In preferred embodiments, the limits of the established range of load angle values is defined by a positive value of from 180 to 270 degrees electrical and a negative value of from −180 to −270 degrees electrical, and most desirably the positive value limit will be from 200 to 250 degrees electrical and the negative value limit will be from −200 to −250 degrees electrical. The position-feedback device (i.e., an encoder, a resolver, or other device capable of providing bi-directional position information when associated with a stepper motor) utilized may be capable of generating as few as 200 counts per revolution of the motor shaft.

Normally, the method of the invention will additionally include a further step, effected only upon a determination having been made that the corresponding load angle value lies beyond the established range of load angle values, and as an initial component of the action for recovery of the lost motor steps, of calculating the number of motor steps that were lost during and, if not previously recovered, prior to the instant period of position-indicating feedback signal access. As a further component of the action taken for recovery of lost steps, absolute position error is determined by accessing a feedback signal generated by the position-feedback device, and is employed for calculating the number of lost steps.

Other objects of the invention are attained by the provision of a stepper motor system comprised of a stepper motor and a controller configured for operation of the motor in synchronous, open-loop mode, which system includes misstep detection and motor step recovery apparatus comprising:

means for establishing a range of load angle values that are representative of normal motor operation, with load angle values outside of that range being indicative of the occurrence of at least one misstep;

a position-feedback device for periodically, in the course of movement of the stepper motor along a trajectory, determining the actual position of the motor shaft and generating a signal representative of such actual position;

means for periodically, in the course of movement of the stepper motor along a trajectory, computing any deviation from a commanded position that occurs, using the representative signal generated by the position-feedback device, by subtracting the actual shaft position from the corresponding commanded position, and generating a signal representative of the position deviation;

means for utilizing each computed position deviation solely to determine if it corresponds to a load angle value that lies either within or beyond the established range of load angle values; and means for immediately taking action for recovery of lost motor steps if, and only if, the corresponding load angle value is determined to lie beyond the established range.

The system will normally additionally include means for calculating the number of steps that were lost during, and prior to (if not previously recovered), any period of position-indicating feedback signal access in which the corresponding load angle value is determined to lie beyond the established range of load angle values. Such means for calculating will be operatively connected to receive feedback signals from the position-feedback device, and will be constructed to employ absolute position error data for calculating the number of lost steps. The means for establishing a range of load angle values, the means for computing target position deviations, the means for utilizing computed position deviation, and the means for taking action will comprise integrated software or firmware, or both.

Thus, to enable misstep detection and motor step recovery in a stepper motor system, using an incorporated position-feedback device, position deviation is computed periodically and cyclically by subtracting the feedback position from the corresponding commanded position (i.e., the position to which the rotor should have arrived at any given instant, following the commanded trajectory) to determine the load angle and operating status of the motor. The load angle will normally lie within the established allowable limits, and stepper operation along the programmed trajectory will therefore simply be maintained. In instances in which the load angle value exceeds the specified zone (i.e., passes beyond the limits of the established range, in a positive or a negative direction), however, and thereby indicates that a misstep has occurred, the controller will take immediate action to recover all lost motor steps, and to reestablish synchronism and then continue to attain the target position, with minimal loss of time.

It will be appreciated that stepper motors having different pole count configurations may require position-feedback devices that are capable of generating different minimum numbers of feedback pulse counts, albeit four to eight counts per pole will usually be sufficient; more than 20 pulse counts per pole may be considered excessive, as a matter of cost, size, complexity, and practical operating considerations. By way of comparison, whereas the present system and method may employ a position feedback device capable of generating only 200 counts per resolution, an analogous stepper motor, operating in full closed-loop mode, would require a position-feedback device capable of generating at least 4000 counts per revolution. The main features of the present method and system are regarded to be:

- maintaining simple open-loop stepper motor operation (e.g., neither the sequencer nor stator commutation is based upon position feedback);
- taking corrective action only after a misstep has been detected; and
- the ability to employ position feedback devices having a wide range of resolution characteristics, which may be as low as 200 counts per motor revolution (based upon a standard 50-poles step motor).

BRIEF DESCRIPTION OF THE SEVERAL VIEWS OF THE DRAWING

Each of FIGS. 4-1, 4-2 and 4-3 is a graph showing stepper motor velocity, plotted as a function of time, under respectively different conditions: FIG. 4-1 shows a typical successful trapezoidal motion profile wherein actual rotor velocity conforms to the commanded velocity; FIG. 4-2 shows a motion profile that typically occurs in a prior art stepper system in which misstep correction is effected by way of a move that is made subsequent to completion of motion, with velocity dropping to zero before any correction is made; and FIG. 4-3 shows a typical motion profile that occurs in a stepper motor system embodying the present invention, wherein a misstep is immediately detected and lost motor steps are immediately recovered to thereby minimize the total length of time that is required for attaining the final target position.

DETAILED DESCRIPTION OF THE INVENTION

Figure 1:
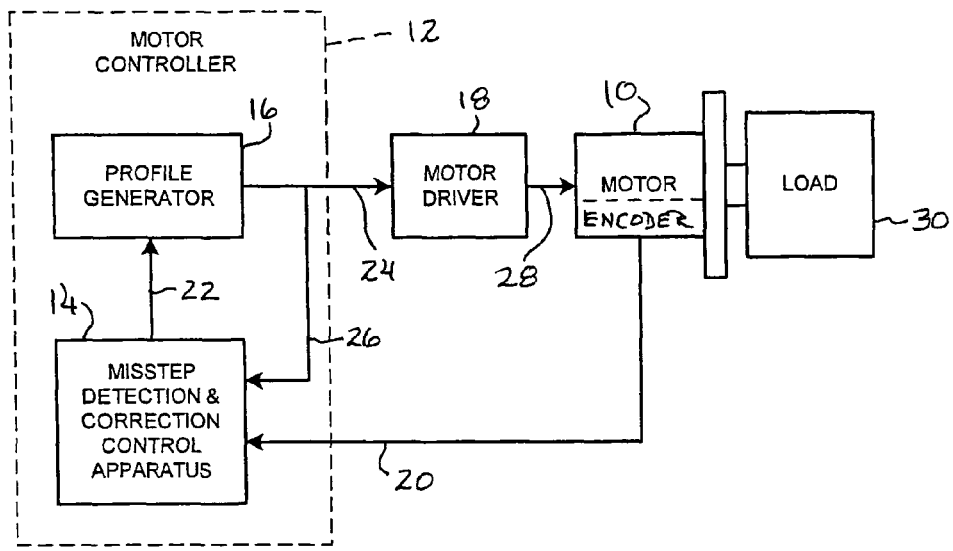
FIG. 1 is a block diagram illustrating a stepper motor system embodying the present invention.

The stepper motor system of FIG. 1 consists of a stepper motor 10, into which a low-resolution (e.g., 200 to 400 counts per revolution) position feedback device (not separately indicated) is incorporated; a motor controller 12, comprised of a misstep detection and correction control apparatus 14 and a profile generator 16; and a motor driver 18. The encoder of the motor 10 generates and transmits rotor position feedback signals along line 20 to the detection and correction control apparatus 14, which generates and transmits a signal along line 22 to the profile generator 16. The profile generator 16 generates commanded position signals, which are transmitted along lines 24 and 26 to the motor driver 18 and the detection and control apparatus 14, respectively, and signals from the motor driver 18 are transmitted to the motor 10 along line 28. A load 30 is connected to the motor shaft.

Commanded positions, in the form of digital values or traditional pulse and direction signals, are sent to the motor driver section 18, where the command signal is converted to motor step sequences so as to cause the motor 10 to rotate at the intended speeds (pulse rates) and to attain precise target positions (numbers of pulses received). Feedback position signals are decoded and converted to motor step units, so that position errors can be computed. Position errors (in motor steps) are then compared to the established misstep detection threshold values (as discussed with reference to FIG. 2), to determine whether or not the motor is operating normally (i.e., without any misstep). If it is found that no misstep occurred, normal operation simply continues, without modification; if, on the other hand, any misstep has been detected appropriate action is taken to correct for (i.e., recover) the lost steps.

Figure 2:
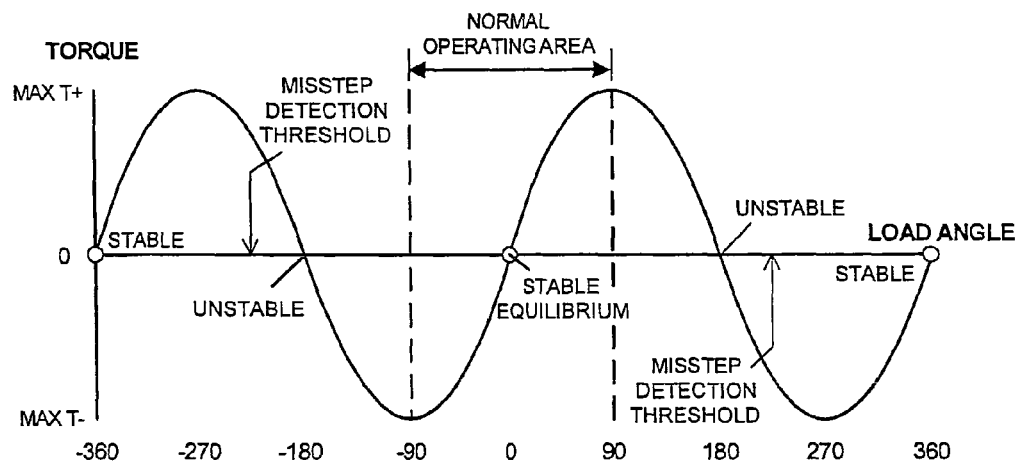
FIG. 2 is a graphic representation of motor torque output, as a function of load angle (i.e., rotor-stator relative displacement, in electrical degrees). It is noted that one motor torque cycle is equivalent to one electrical cycle or one magnetic pole pair; i.e., a typical 50 poles stepper motor has 50 electrical cycles in which the electric current is commutated in the stator field.

As shown in FIG. 2, the torque output of the motor, plotted as a function of load angle, varies as a sine function wherein the torque output is equal to the maximum torque times the sine of the load angle, the latter being the displacement (i.e., the angular misalignment) that exists between the position of the rotor and the magnetic field generated by the stator. When the rotor and the stator are in magnetic alignment, therefore, the load angle is zero and no torque is produced; maximum torque is produced when the load angle has a value of +90° or −90° (the sign of the load angle indicates the direction of rotor rotation).

As indicated in FIG. 2, the zone, or area, of normal motor operation contains a stable equilibrium point at which the load angle is zero. When the stator current vector is commutated by a commanded position change, the rotor is of course attracted and (given sufficient torque) caused to turn; output torque is increased appropriately as a result of load angle increases that are correct for producing the commanded velocities. Theoretically, the rotor should always follow the stator magnetic field, and the load angle should not fall outside of the normal operating area.

If the external load 30 is such that it demands more torque than the motor 10 can provide, however, the load angle will slip, or roll over the peak torque point, and then enter an unstable area in which the output torque is actually decreasing. This causes further slowing of the rotor, which can eventually cause it to lose synchronism with the stator and ultimately to result in stalling of the motor.

Since the rotor cannot remain in an unstable area, it will seek and jump to the next adjacent, or neighboring, stable equilibrium area, which is spaced at 360° electrical. When a misstep occurs, therefore, the rotor will be displaced by at least one whole electrical cycle; it may however be displaced by two or more electrical cycles, depending upon operating conditions and motor-control characteristics. The present invention enables such missteps to be detected quickly and reliably using even a low-cost, low-resolution position feedback device, to allow corrective measures to be taken immediately, as described herein.

Figure 3:
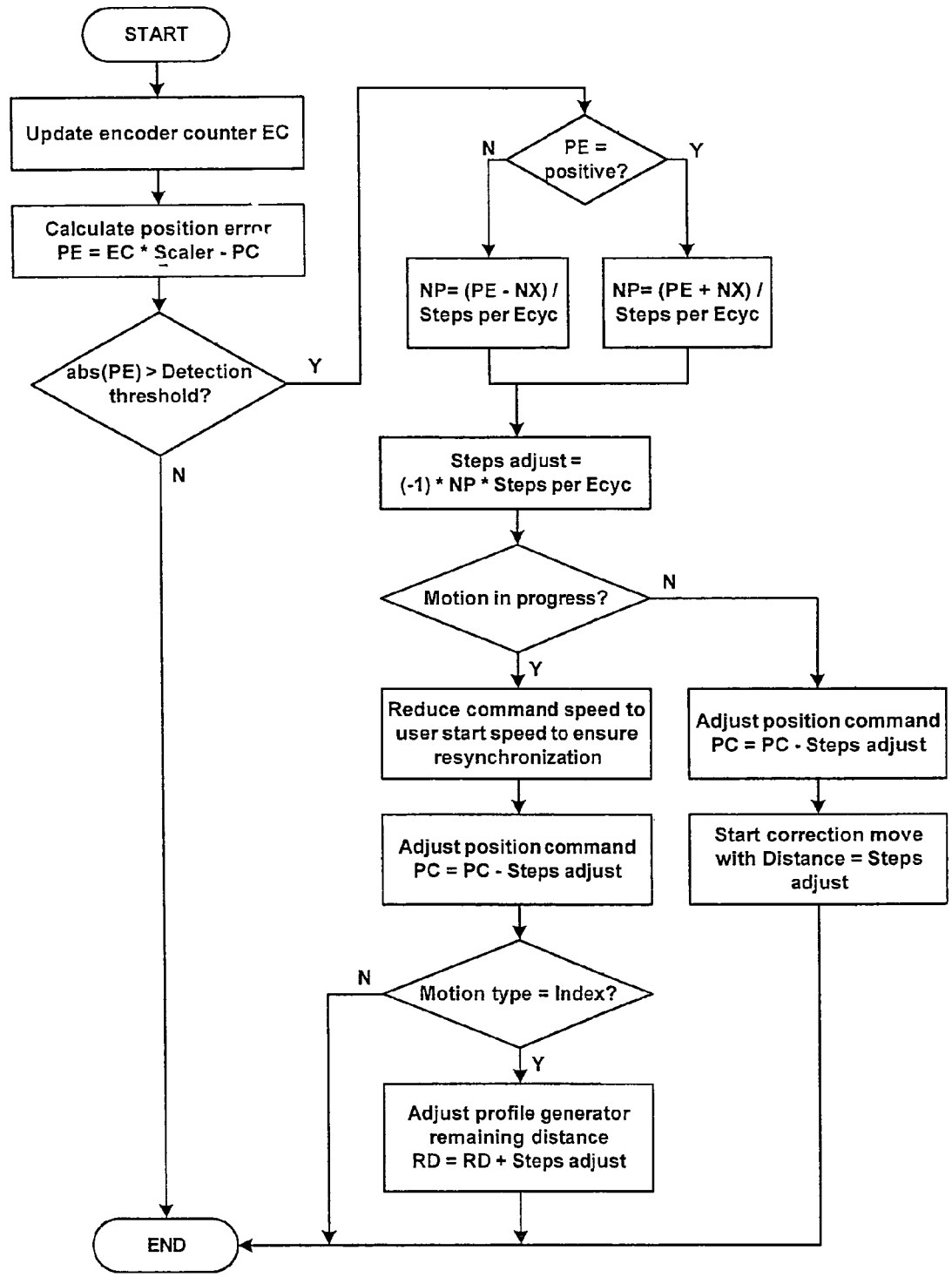
FIG. 3 is a flow chart in which are presented the steps that occur cyclically and periodically in effecting the method, and in accordance with the apparatus and system, of the invention. The abbreviations used have the following meanings: "PC" is commanded position; "EC" is feedback position; "PE" and "abs (PE)" are position error and absolute position error, respectively; "Steps per Ecyc" means motor steps per electrical cycle; "Detection Threshold" is in the representative case, the quantity "Steps per Ecyc*225/360"; "NP" is the number of poles (electrical cycles) slipped; "NX" is an offset factor; and "RD" is remaining distance.

The flow diagram of FIG. 3 presents the steps that are carried out periodically for such misstep detection and correction, and correlates with actual implementation software or firmware that may be integrated into the present system. It is to be noted that FIG. 3 does not purport to show other functions and operations that are effected for normal stepper motor control.

More particularly, as indicated in FIG. 3 a feedback position is decoded at the start and used to update an encoder counter "EC" (it being appreciated that access to the position-feedback device is not limited to times of actual movement of the rotor). Position error "PE" (in motor steps), equal to the encoder counter content times a motor-step units scaler, and minus the commanded position, is determined.

The absolute position error "abs (PE)" is then compared to the established load angle range (not indicated in FIG. 3), to determine if a threshold (limit) value has been exceeded (in a negative or positive direction), and thereby to determine whether or not a misstep has occurred. It is to be noted that the present control method does not detect for, or require knowledge of, actual load angle values, nor does it control the commutation angle at ±90° peak torque points (as do full-time closed-loop controls), which would require the use of high-resolution feedback devices. Rather, the controller need only detect a condition in which the load value exceeds established thresholds or limits, to indicate that a misstep has occurred, for which purpose a feedback device having a resolution as low as 200 counts per revolution may be used.

The misstep detection threshold values indicated were selected somewhat arbitrarily, for purposes of description, at ±225° electrical, it being appreciated that other values in the range of plus or minus 180° through 270° may be selected and may function as well. Use of a value somewhat greater (in a positive or negative sense) than 180° however will guard against the possibility that a false indication of misstep may be produced, whereas setting the limit at a value substantially less than 270° will allow corrective action to be taken with minimal delay. It is noted that the fact that a wide range of misstep detection threshold values may be used in the present method and apparatus verifies that the position feedback device need not be very accurate, and that, as long as the detection threshold area can be identified, a low-resolution feedback device may be optimal in the present apparatus, system, and method. It should be understood that this is so, not from the standpoint of function but rather as a matter of minimizing cost and space requirements, and perhaps of affording some reduction of complexity as well.

In any event, and as pointed out above, if no misstep has occurred the controller exits the misstep-detection function (for the instant period) without any further action being taken. If a misstep is found to have occurred, however, a correction procedure, involving the following actions, is applied immediately:

Initially, the number of lost motor steps must normally be determined because, as emphasized herein, the essential function of the present method and apparatus is only to detect whether or not any misstep (i.e., dropped or slipped pole, or electrical cycle) occurred. As mentioned above, when a misstep occurs the rotor slips by at least one complete electrical cycle, but a plurality of such electrical cycle jumps may also occur before action can be effected (despite being initiated immediately after misstep detection). Therefore, the number of incremental motor steps for which correction is necessary must be calculated, and that is done based on the integer number of poles "NP" that have slipped. As indicated in FIG. 3, it must first be determined whether the position error is positive or negative, following which the value of "NP" is determined, being the quotient of the sum of the calculated position error "PE" and the offset factor "NX," divided by the steps per electrical cycle at which the motor is operating. The offset factor effectively serves (as in common rounding operations) to eliminate from the quotient result any remainder that has a value less than 0.5 and to increase the integer to the next greater whole number if any remainder has a value of 0.5 or greater. The factor "NX" is equal to the steps per electrical cycle for which the motor is commutated, times the quantity F/360, wherein "F" is an empirically established number having a value between 100 and 150; as used in the Examples that follow, F has a value of 135.

It will be appreciated by those skilled in the art that other means for rounding, so as to produce integer quotients, may be employed. For example, NX may be replaced in the calculations shown in FIG. 3 by a rounding factor "RF," equal to the quantity Steps per Ecyc times 0.5. Here again, if the position error is negative the offset factor is subtracted; if it is positive the offset factor is added.

In any event, after rounding has been effected the steps-adjustment number is determined by multiplying the negative value of the number of poles slipped times the steps per electrical cycle value. It is to be noted that the steps-adjustment value is not necessarily equal to the position error, the difference simply being the normal load angle deviation that occurs within the motor operating range.

Having determined the required steps-adjustment number, the state of the motor must also be established. That is, it must be determined if the motor is running (i.e., motion in progress) or at rest (with, in the latter case, the shaft having been displaced by an external force).

If the motor is running the commanded speed, or pulse rate, must be reduced to the starting speed so as to ensure that the rotor can once again resynchronize with stator commutation at the lower speed. The commanded position PC is then adjusted by subtracting the number of steps lost so that the commanded position matches the pole in which the rotor resides, and if the character of the motion is an indexing or point-to-point type adjustment for any remaining travel distance must be made as well. After the adjustment has been made, the motor will resume ramping to the speed set by the profile generator, in response to subsequent system control samplings.

On the other hand, if the check of the motion state indicates that the motor is idle, the commanded position is adjusted by subtracting the number of lost motor steps so that the final destination, after the application of a correction movement, will match the feedback position. To accomplish that, the correction command generated will produce travel through a distance that is equal to the number of the lost steps, but in the opposite direction.

A load angle wrap-around (360°) characteristic conveniently accommodates the misstep detection functions that are performed by the present system, particularly as providing a universal (i.e., from system-to-system, and within a given system) expression of misstep-indicating threshold values, and also in minimizing digital data memory space requirements. On the other hand, while position error is closely correlated to load angle, its value varies from motor-to-motor and/or depends upon the controller configuration. But, as mentioned above, because information to indicate the number of electrical cycles that may have been slipped during or (if not previously corrected for) previous to each monitoring (sampling) access period is not reflected in load angle data, absolute position error (which retains information as to exactly the number of poles that were slipped, and contains and provides the desired load angle information [unwrapped] when incremental steps are converted to angle values) is used to compute the number of such steps that have been lost.

Figures 1, 4:
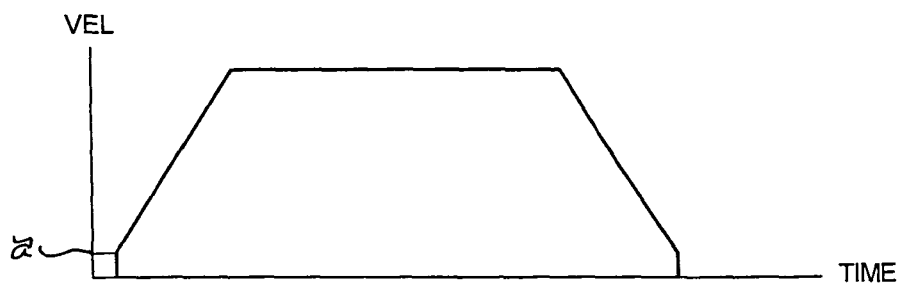
Figures 2, 4:
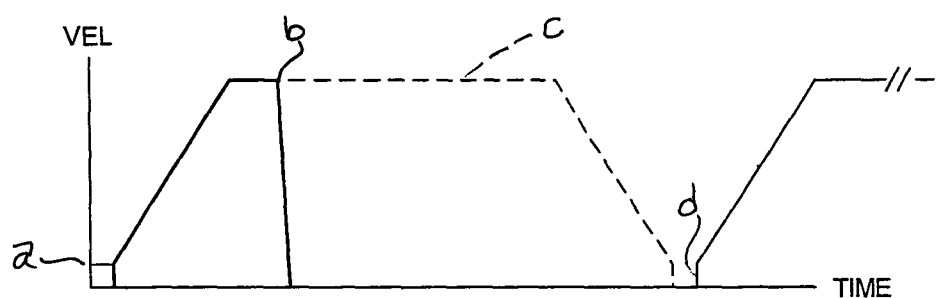
Figures 3, 4:
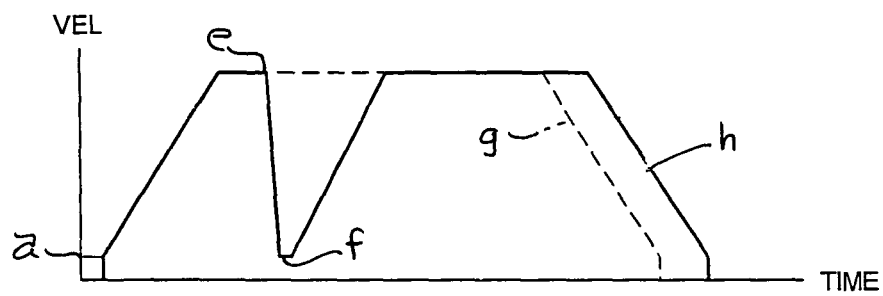

Considering FIGS. 4-1, 4-2 and 4-3 in further detail, in all diagrams the letter "a" indicates a starting velocity. As noted above, a typical successful trapezoidal motion profile, in which actual movement duplicates the commanded profile, is depicted in FIG. 4-1; and FIG. 4-2 illustrates a prior art method, applied to a stepper motor having position-feedback capability, wherein "b" indicates the point at which the motor stalled, "c" indicates the profile of the continuing trajectory, and "d" indicates the point at which a correction move is made.

FIG. 4-3 illustrates the method of the present invention, wherein a misstep is detected, and corrected for immediately. The letter "e" indicates the point at which a misstep occurred and the motor stalled, "f" indicates a point at which the commanded velocity was reduced to zero and the motor was resynchronized and again ramped-up, "g" indicates an original commanded trajectory, and "h" indicates a modified trajectory that was produced by the motor following the application of corrective action to recover lost steps. As can be seen, the target position is attained after the elapse of only minimal correction time.

Illustrative of the effectiveness of the present invention are the Examples that follow. In all instances a common, two-phase 50-pole (pole pair) stepper motor, fitted with an encoder, as a position-feedback device, having a resolution of 200 counts per revolution, is used, with feedback signals from the encoder being accessed at 250-microsecond intervals. Motor resolution (independent of the encoder) is user-selectable to have a value of 200, 400, 1,000, etc., to as high as 125,000 steps (i.e., microsteps), per revolution.

Example One

The stepper motor resolution is set for commutation at 10,000 steps per revolution, equivalent to 200 steps per electrical cycle and 50 steps (scaling factor) per encoder count. The misstep detection threshold is set at plus and minus 225° (defining the limits of the load angle value range for normal motor operation), and the offset or bias value (NX) is 75 steps (200 steps per electrical cycle times F/360°, where F has the empirically assigned value 135°, as discussed above). The profile generator of the motor system is programmed to generate a trapezoidal motion in the positive direction with an Index distance of 200,000 steps, a running velocity of 1,000 rpm, and a starting speed of 50 rpm.

Part A (No Misstep)

The first commanded position (PC) is arbitrarily deemed to be 10 revolutions away from the starting position of the rotor (i.e., 100,000 steps). If the encoder counter (EC) contains a value of 2,000 counts [10 revolutions*200 counts/revolution], the system would have correctly determined that no misstep occurred. Thus, the position error [2,000 (EC)*50 (scaling factor)–100,000 (PC)] is zero; obviously PE would not have exceeded the absolute (misstep-indicating) position error of 125 steps [200 steps/360°*225°].

Part B (One Misstep)

The first commanded position is arbitrarily deemed to be 11 revolutions away from the starting position of the rotor (i.e., PC=110,000 steps), and it is assumed that conditions caused a single misstep to occur. The present system would determine the loss, as follows:

Because one pole (i.e., four encoder counts) was slipped, EC would have a value of 2196 (or possibly 2195 or 2197, depending upon rotor dynamics), rather than containing the correct value (i.e., with no misstep) of 2200. Therefore the position error would be –200 motor steps [2196 (EC)*50 (scaling factor)–110,000 (PC)], thus lying beyond the threshold of 125 steps (equivalent to 225°) of the load angle range and thereby indicating that at least one misstep occurred during the instant position-feedback sampling period.

As indicated with reference to FIG. 3, once having determined that the detection threshold is exceeded calculation of the number of poles slipped "NP" depends upon whether the position error is negative [in which case NP=(PE–NX)/steps per Ecyc.] or positive [in which case NP=(PE+NX)/steps per Ecyc]. In the present example Part, NP is negative and is therefore equal to –1.375 [(–200–75)/200], with the integer indicating that one (negative) pole is slipped.

The number (and sign) of the steps needed for adjustment (to attain the commanded position) is then determined, and found to equal (–1)NP*Steps per Ecyc; i.e., 200 [(–1)*(–1) *200=200] in the present Example. Because motion is in progress, the command speed is reduced (unless the starting speed had been reached), using the user-selected deceleration rate and adjusting the position command (PC) to match the pole in which the rotor resides; i.e., adjusted PC equal to PC (110,000) minus the steps adjustment (200), or 109,800 steps. It should perhaps be noted that, because the PC value is an instantaneous position command, the final target position is not affected.

Finally, because the system is of the indexing motion type, the profile generator must also be adjusted to determine the remaining distance (i.e., the final distance less the distance already moved) that must be traveled in order to attain the target position. In the present case, the remaining distance is 90,000 steps (200,000 minus 110,000); since the distance traveled was shorted by 200 steps, correction must be made (i.e., the corrected remaining distance equals RD plus 200 steps).

As noted, the foregoing example (Part B) describes a single misstep detection and recovery cycle effected in accordance with the present invention. The described procedure is of course repeated cyclically, at each predetermined, fixed time interval of position-feedback access, until there is no further misstep. It will also be appreciated that the system will effect an automatic ramp-up of the profile generator to attain the previously set speed.

Example Two

The stepper motor resolution is set for commutation at 200 steps per revolution, equivalent to four steps per electrical cycle and a scaling factor of one step per encoder count. The misstep detection threshold is again set at plus and minus 225°, equivalent here to two motor steps (four steps per electrical cycle*225°/360°, with the 0.5 step remainder being ignored); the bias value (NX) is one step (four steps per electrical cycle times 135°/360°, with the 0.5 step remainder again being ignored). In this Example, a relatively slow processor is employed, with access to the encoder, for signal sampling, being had at one-millisecond intervals. The profile generator of the system is programmed to generate a trapezoidal motion in the positive direction, with an Index distance of 5,000 steps, a running velocity of 1,000 rpm, and a starting speed of 50 rpm.

The first commanded position (PC) is deemed to be 11 revolutions away from the starting position of the rotor (i.e., 2,200 steps), and it is assumed that conditions caused two missteps to occur. The present system would determine the lost motor steps, as follows:

Because two poles (i.e., eight encoder counts) were slipped, EC would have a nominal value of 2192, rather than containing the correct value (i.e., without any misstep) of 2200. Therefore, the position error would be –8 motor steps [2192 (EC)*1 (scaling factor)–2,200 (PC)], thus lying beyond the 225° threshold (equivalent to 2 steps) of the load angle range and thereby indicating that at least one, previously undetected misstep occurred during, or prior to, the instant position-feedback sampling period.

Having determined that the detection threshold is exceeded, and because NP has a negative value, the number of poles slipped is calculated to be −2.125 [(−8−1)/4], with the integer indicating that two (negative) poles are slipped. Because motion is in progress, the command speed is reduced to equal PC minus the steps adjustment (2,200−8=2,192). And because the system is of the indexing motion type the profile generator is also adjusted to determine the remaining distance, "RD" to the target position, which is, in this case, 2,800 steps (5,000−2,200); since the distance traveled was shorted by 8 steps, the corrected remaining distance equals RD plus 8 steps.

Thus, it can be seen that the present invention provides a novel stepper motor apparatus and system, and a novel method utilizing the same, wherein and whereby missteps are readily detected using periodic position-feedback data, to enable immediate recovery of lost motor steps. In accordance with the invention, load angle values, based upon position error determinations, are utilized to indicate the occurrence of missteps. If a misstep is detected (but not otherwise) position error feedback information is utilized to immediately determine the number thereof and the number of motor steps that have been lost during the instant period and during any prior period (if not previously detected), to enable their recovery. The present apparatus, system, and method may provide significant cost and operating benefits, as compared to comparable, conventional technology.

Having thus described the invention, what is claimed is:

1. A method for misstep detection and motor step recovery in a stepper motor operating in synchronous, open-loop mode, comprising the steps:
    operating a stepper motor in synchronous, open-loop mode to produce movement along a trajectory comprised of commanded target positions;
    establishing a range of load angle values that are representative of normal motor operation, with load angle values outside of said established range being indicative of the occurrence of at least one misstep;
    periodically, in the course of movement of the stepper motor along said trajectory, accessing feedback signals, generated by a position-feedback device, to determine the actual position of the motor shaft;
    periodically, in the course of movement of the stepper motor along said trajectory, computing deviations from commanded positions by subtracting actual shaft positions, indicated by said accessed feedback signals generated by the position-feedback device, from corresponding commanded positions;
    utilizing each computed position deviation solely to determine if it corresponds to a load angle value that lies either within or beyond said established range of load angle values;
    if, throughout each period of position-indicating feedback signal access, said corresponding load angle value is determined to lie within said range of established load angle values, maintaining normal stepper operation of the motor along said trajectory, without adjustment; and
    if, during any period of position-indicating feedback signal access, said corresponding load angle value is determined to lie beyond said established range, immediately taking action for recovery of lost motor steps.

2. The method of claim 1 wherein the limits of said established range of load angle values is defined by a positive value of from 180 to 270 degrees electrical and a negative value of from −180 to −270 degrees electrical.

3. The method of claim 2 wherein the said positive value limit is from 200 to 250 degrees electrical and said negative value limit is from −200 to −250 degrees electrical.

4. The method of claim 1 wherein the feedback signals consist of a few as 200 counts per revolution of the motor rotor.

5. The method of claim 1 additionally including a further step, effected only upon a determination having been made that said corresponding load angle value lies beyond said established range of load angle values, and as an initial component of said action for recovery of said lost motor steps, of calculating the total number of motor steps that were lost and not previously recovered.

6. The method of claim 5 wherein, as a component of said action for recovery of said lost motor steps, absolute position error is determined by accessing a feedback signal generated by the position feedback device and is employed for calculating the number of said lost motor steps.

7. In a stepper motor system comprised of a stepper motor and a controller configured for operation of said motor in synchronous, open-loop mode to produce movement along a trajectory comprised of commanded target positions, misstep detection and motor step recovery apparatus comprising:
    means for establishing a range of load angle values that are representative of normal motor operation, with load angle values outside of said established range being indicative of the occurrence of at least one misstep;
    a position-feedback device for periodically, in the course of movement of said stepper motor along a trajectory, determining the actual position of the motor shaft and generating a signal representative of such actual shaft position;
    means for periodically, in the course of movement of said stepper motor along such a trajectory, computing any deviation from a commanded position, using said representative signal generated by said position-feedback device, by subtracting the actual shaft position from the corresponding commanded position, and generating a signal representative of the position deviation;
    means for utilizing each computed position deviation solely to determine if it corresponds to a load angle value that lies either within or beyond said established range of load angle values; and
    means for immediately taking action for recovery of lost motor steps if, and only if, said corresponding load angle value is determined to lie beyond said established range.

8. The system of claim 7 additionally including means for calculating the number of unrecovered motor steps that were lost during, and prior to, any period of position-indicating feedback signal access in which said corresponding load angle value is determined to lie beyond said established range of load angle values.

9. The system of claim 8 wherein said means for calculating is operatively connected to received feedback signals from said position-feedback device, and is constructed to employ absolute position error data for said calculation of the number of lost motor steps.

10. The system of claim 9 wherein said means for establishing a range of load angle values, said means for computing target position deviations, said means for utilizing computed position deviation, and said means for taking action, comprise software and/or firmware integrated in said system.

* * * * *